Jan. 23, 1945.    LE ROY M. KUBAUGH    2,367,830
RESILIENT MOUNTING
Filed Oct. 27, 1942
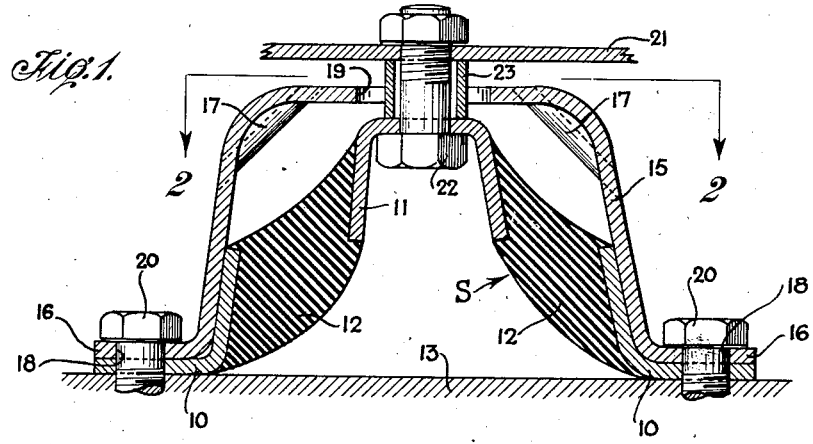
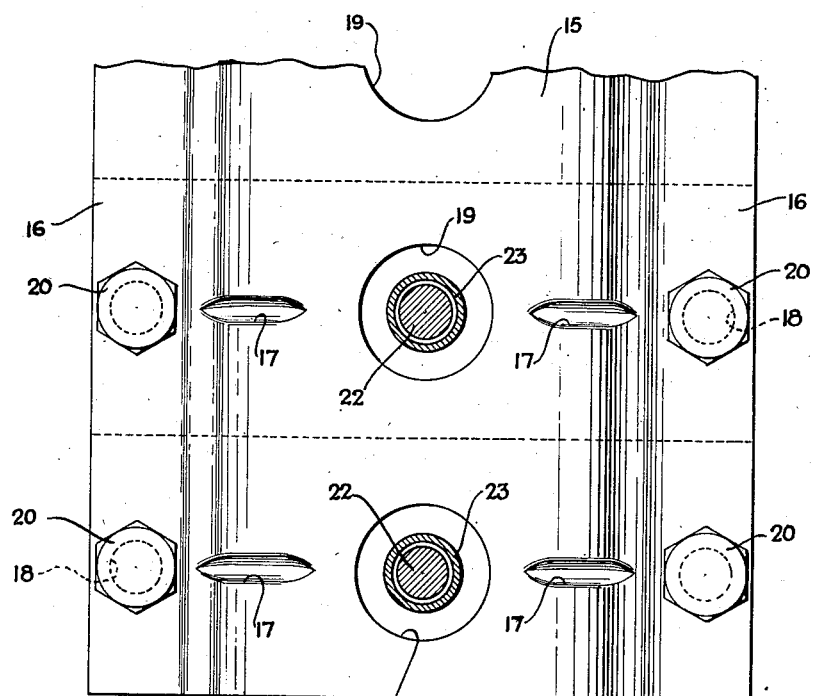
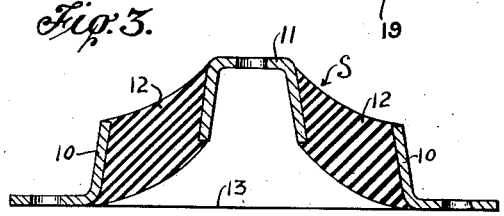
INVENTOR
LEROY M. KUBAUGH
ATTORNEYS Patented Jan. 23, 1945

2,367,830

UNITED STATES PATENT OFFICE 2,367,830

RESILIENT MOUNTING

Le Roy M. Kubaugh, Akron, Ohio, assignor to The Firestone Tire & Rubber Company, Akron, Ohio, a corporation of Ohio Application October 27, 1942, Serial No. 463,505

1 Claim. (Cl. 248—358)

This invention relates to resilient mountings and more especially it relates to improved resilient mountings comprising rubber such as are used for vibration insulators or for other yielding or flexible connections interposed between supporting and supported structures.

The chief objects of the invention are to provide in an improved manner for reducing the sag or permanent set of the rubber element or elements of resilient mountings of the character mentioned; to increase the capability of static deflection of the mounting and thereby to reduce its natural frequency of vibration. More specifically the invention aims to provide a simple means for obtaining pre-compression of the rubber structure of resilient mountings of the character mentioned and thereby to achieve the attendant benefits of such pre-compression; to provide a safety feature that functions in case of failure of the rubber of the mounting; and to provide a mechanical shield that protects the rubber of the mounting from oil saturation and other hazards to which it may be exposed during use. Other objects will be manifest as the description proceeds.

For illustrative purposes, the invention will be shown and described with relation to the resilient mounting shown in Figure 4 of U. S. Patent No. 2,047,493 to Curt Saurer, issued July 14, 1936, upon which mounting the present invention is an improvement.

Of the accompanying drawing:

Fig. 1 is a transverse section through an embodiment of the invention, in operative association with a supporting structure and a supported structure;

Fig. 2 is a plan view of the improved mounting as seen from line 2—2 of Fig. 1; and Fig. 3 is a transverse section through the resilient unit of the mounting in the unstressed condition in which it is molded.

Resilient mountings of the character mentioned commonly are used for supporting vibratory structures upon non-vibratory structures, such as the mounting of an electrical motor or an internal combustion engine upon a floor or ceiling. Also they are used for mounting a vehicle motor upon the frame of the vehicle. In either case an important function of the mounting is to absorb and/or suppress the motor vibrations and prevent or retard their transmission to the supporting structure. Although prior rubber mountings, such as the Saurer mounting aforementioned, have given excellent all-around performance, they were believed to be capable of improvement in their vibration-dampening characteristic, that is, their transmissibility could be decreased.

The improving of the prior resilient mountings according to the present invention is based on the theory that:

The natural frequency of a rubber mounting is given closely by the formula $$f_n = \frac{3.13}{\sqrt{d}} \text{ cycles per second}$$

wherein $f_n$=natural or resonant frequency, and $d$=deflection in inches under static load.

Transmissibility is given by:

$$E = \frac{1}{\left(\frac{fd}{f_n}\right)^2 - 1}$$

wherein $E$=transmissibility and $fd$=the disturbing frequency. These formulae clearly show that in order to decrease transmissibility, the $f_n$ should be as low as possible, and that the static deflection per unit load should be as great as possible consistent with required stability, allowable stresses in the rubber, etc. In applying the theory of the invention to a specific rubber vibration insulator, the aforementioned Saurer mounting is employed, and said mounting, in normal condition, is deformed and narrowed by laterally directed pressure so that the rubber elements thereof have a determinate amount of pre-compression. The term "pre-compression" as used herein refers to compressive stress of the rubber elements, maintained by the other elements of the mounting, irrespective of the stresses placed thereon by the structure supported thereby.

Referring to the drawing, there is shown in Fig. 3 thereof a transverse section of the Saurer resilient mounting aforementioned, the same being in normal unstressed condition. Said mounting is designated as a whole by the character S, and consists of parallel, spaced-apart, angular lateral strips 10, 10, composed of metal, a metal channel strip 11 positioned between the strips 10 and parallel thereto, the channel preferably being inverted so that its base is uppermost and the entire strip being somewhat elevated with relation to the strips 10, and cushions 12, 12 of resilient rubber vulcanized to the respective lateral faces of the channel and to the adjacent lateral faces of the respective angle strips 10. At least the bottom face of each cushion 12 is arcuate as shown, the arrangement being such that as the channel 11 is depressed or deflected during use the bottom face of each cushion progressively makes contact with the surface 13 of the supporting structure (not shown) upon which the lateral strips are mounted, with the result that the cushions offer progressively increasing resistance to such deflection. The structure may be of any length desired, but preferably is made in relatively long lengths so that shorter lengths may be cut therefrom. Both lateral strips 10 and the channel strip 11 are formed with bolt holes, as shown, to receive the bolts that secure them to a supporting structure and supported structure respectively. Preferably each angle strip 10 is so shaped that the included angle defined by the legs thereof is greater than 90 degrees, and said strips are so arranged that the upstanding legs thereof converge toward each other. The lateral legs of the channel 11 diverge from their common base, the arrangement being such that the channel legs and the adjacent legs of the lateral strips 10 are in substantial parallelism transversely as well as longitudinally.

Referring now to Figs. 1 and 2 of the drawing, the resilient unit S is shown in combination with means by which precompression is imparted to the rubber elements thereof. As shown therein, said means consists of an inverted channel-like structure 15 having outwardly turned marginal flanges 16, 16. The depth of the channel structure 15 is somewhat greater than the height of the mounting S, and the greatest width of the channel of the structure is less than the greatest width of the mounting S between the upstanding legs of the lateral strips 10 thereof. Furthermore, the sides of the structure 15 diverge from the base thereof at substantially the same angle as the included angle between the respective legs of the said lateral strips 10 of the mounting S. Like the latter, the structure 15 may be made initially in a relatively long length, shorter lengths if required being cut therefrom, as indicated by the transverse broken lines, Fig. 2. The channel structure 15 is reinforced at spaced points throughout its length by re-entrant ribs or webs 17, 17 formed diagonally across the rounded corners at the juncture of its base portion with the respective sides of the structure. The flanges 16 of the structure 15 are formed with bolt holes 18 and the base of the structure is formed with a longitudinal series of centrally positioned apertures 19, 19. The ribs 17, the bolt holes 18, and the apertures 19 are in alignment transversely of the structure, and are so spaced longitudinally of the structure that the shortest practical length severed from the structure, as indicated by the broken lines in Fig. 2, will include at least one transverse series of said bolt holes, apertures, and ribs. In an assembled mounting comprising a resilient unit S and a channel structure 15, the latter and said resilient unit are the same length.

In the assembling of the mounting, the structure 15 is forced down upon a unit S, or alternatively, the latter is forced into the channel of the structure 15. This operation readily is accomplished since the sides of the resilient unit S and the channel structure 15 are complementally sloped. Since the width of the channel structure is less than the width of the resilient unit, such telescoping of the members causes the structure 15 to exert a wedging effect against the outwardly directed lateral faces of the strips 10 of the unit S, and thereby to move said strips laterally toward each other and toward opposite sides of the channel 11, and to elevate the latter somewhat above its normal position. This results in such deformation and deflection of the rubber bodies 12 of the resilient unit as to put said bodies under compressive stress, referred to herein as "precompression." When the channel 15 and unit S are fully telescoped, the flanges 16 of the channel are in juxtaposition with the laterally extending legs of the strips 10 of the unit S, and the bolt holes 18 of the channel are in registry with the bolt holes of said strips 10. Thus both elements may be secured to an underlying supporting structure 13 by bolts or cap screws 20 that extend through said aligned bolt holes. In the assembled mounting the bolt holes in the channel 11 of the resilient unit are in alignment with the apertures 19 of the channel structure 15. Thus a supported structure, shown at 21, may be secured to the channel of the resilient unit by means of a bolt or bolts 22 that extend through the said apertures 19, each bolt extending through a spacer sleeve 23 disposed between the channel 11 and the supported structure 21.

Because of the pre-compression imparted to the rubber bodies of the mounting, the tendency of the said bodies to sag or to take a permanent set is materially reduced. Furthermore, the rubber bodies have greater static deflection than they would have if not compressed, with the result that the natural frequency of vibration of the mounting is reduced. This fact is verified by the following test data made with a mounting 2 inches in length, the rubber bodies being of 40 durometer hardness as molded.

| Not compressed | | | Under pre-compression | | |
|---|---|---|---|---|---|
| Load | Deflection | $f_n$ calculated | Load | Deflection | $f_n$ calculated |
| Pounds | Inches | Cycles/sec. | Pounds | Inches | Cycles/sec. |
| 12 | .050 | 14.0 | 11.5 | .050 | 14.0 |
| 22 | .100 | 9.9 | 21.5 | .100 | 9.9 |
| 33 | .150 | 8.1 | 31.3 | .150 | 8.1 |
| 42 | .200 | 7.0 | 39.0 | .200 | 7.0 |
| 54 | .250 | 6.26 | 47.5 | .250 | 6.26 |

The foregoing data clearly show that the same deflection in a pre-compressed mounting may be obtained with a lighter static load than in an uncompressed mounting.

The invention provides in a simple manner for imparting pre-compression to a resilient mounting unit of the character described, whereby the attendant benefits of pre-compression are achieved. The channel structure 15 of the unit also shields the rubber elements of the mounting from damage by oil saturation and other causes, and it constitutes a safety feature in case there is a complete failure of the bond between the rubber bodies and the elements to which they are bonded.

Obviously modifications may be made without departing from the spirit of the invention, therefore it is to be understood that the invention is to be limited only by the scope of the appended claim and the prior art.

I claim:

In a resilient mounting of the character described, the combination of a resilient unit comprising a pair of parallel, spaced-apart angular lateral strips each securable to a supporting structure, an intermediate channel shaped downwardly turned strip spaced between and somewhat offset from said lateral strips and securable to a supported structure, and a pair of spaced apart cushions of resilient material each bonded to one lateral face of the said channel shaped strip and to the adjacent face of a said lateral strip, said channel shaped strip having centrally positioned holes adapted to receive attaching bolts projected from said supported structure, a channel shaped cover structure telescoped upon the resilient unit and engaging the outer faces of the said lateral strips only, the channel being narrower than the resilient unit so that said lateral strips are deflected toward each other and the cushions are thereby placed under pre-compressive stress said cover structure having outlet holes through which said attaching bolts extend, said outlet openings being sufficiently large to afford clearance for the movement of said bolts when said mounting is actuated in service.

LE ROY M. KUBAUGH.